United States Patent Office 3,183,068
Patented May 11, 1965

3,183,068
LUMINOUSLY BURNING FUEL GELS
John Alexander Monick, Teaneck, N.J., assignor to Colgate-Palmolive Company, New York, N.Y., a corporation of Delaware
No Drawing. Filed May 17, 1962, Ser. No. 195,435
15 Claims. (Cl. 44—7)

This invention relates to gel compositions. More particularly, the invention is of a fuel gel composition comprising an alcohol gel fuel which burns with a readily visible soot-free flame.

Most alcohol gel fuels presently available have good properties of combustion. However, due to the relatively high alcohol content, they burn with a substantially non-visible flame and without soot or smoke. Although it is desirable to have such fuels burn without producing soot or smoke, the non-visible flame presents a safety problem. For example, an individual using such fuel gels exposes himself to injury from burns since it is difficult to see the flame. It is desirable, therefore, to provide an alcohol gel fuel which burns with a readily visible flame. Moreover, it is preferable that the fuel burn without substantial production of soot or smoke. Such an alcohol fuel gel should also present good properties of stability and the gel structure should not break down over prolonged periods of storage.

In accordance with the present invention, there is provided an alcohol fuel gel composition which meets the above requirements and which comprises a major proportion of an alcohol fuel gel which by itself burns with a substantially non-visible flame and a minor proportion sufficient to make the gel burn with a visible flame of a compound selected from the group consisting of benzaldehyde, benzoic acid, compounds of the formula

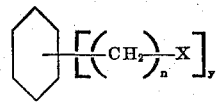

wherein X is selected from the group consisting of hydrogen, —CHO and —COOH, $n$ is a number from 1 to 15, $y$ is a number from 1 to 3 and the total number of carbon atoms in the aliphatic portion of the molecule is 1 to 15, and compounds of the formula

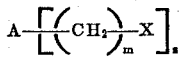

wherein A is selected from the group consisting of naphthalene, anthracene, and phenanthrene nuclei, X is selected from the group consisting of hydrogen, —CHO and —COOH, $m$ is a number from 0 to 15, $z$ is a number from 1 to 3 and the total number of carbon atoms in the aliphatic portion of the molecule is 1 to 15.

Some representative examples of compounds within the generic formulas given are tridecylbenzene, toluene, xylene, naphthalene, tridecylnaphthalene, naphthaldehyde, naphthoic acid, anthracene, phenanthrene, anthranaldehyde, carboxy acids of anthracene and phenanthrene and the like, including suitable isomers and salts thereof.

Suitable alcoholic fuel gels, in which the above defined compounds or illuminating agents can be incorporated may be defined to a substantial degree by their fuel, gelling agent and adjuvant constituents. The fuel gel compositions contain a lower aliphatic alcohol which burns with a substantially non-visible soot-free flame, such as methyl and ethyl alcohols. The gelling agents employed with such alcohols include natural and synthetic gums and the like. Among the preferred gelling agents are cellulose and modified celluloses, such as methyl cellulose, ethyl cellulose, dihydroxy methyl ether derivatives of cellulose, hydroxyethyl and hydroxymethyl celluloses, nitrocelluloses and the like. Additional gelling agents which can be employed in preparing the new compositions of the invention include hydrophilic carboxy vinyl polymers, such as cross-linked and non cross-linked mono-olefinic polymers, copolymers and interpolymers and copolymers of maleic anhydride with olefinic type materials. Among the preferred carboxy vinyl type polymers is an interpolymer of acrylic acid which is cross-linked with a minor amount of a monomeric polyether of sucrose in which the hydroxyls are etherified with a plurality of allyl groups. Representative of the olefin maleic anhydride copolymers is one in which the anhydride is copolymerized with a low molecular weight olefin, such as ethylene, propylene and butylene and the like in substantially equimolar amounts. Another type of gelling agent which can be utiilzed in the alcohol gel is a soap gel which contains the reaction product of a higher fatty acid and an alkali and a higher free fatty acid, such as stearic acid, palimitic acid and the like. Regardless of which particular gelling agent is employed in making a fuel gel which has the illuminating agents incorporated therein in accordance with the instant invention, it is usually beneficial to employ the gelling agents in relatively small proportions in comparison to the alcohol in order to obtain good properties of combustibility and prduce a composition which gives a high amount of heat. The gelling agents are available through normal commercial channels and, depending upon the particular viscosity of standard test solutions of the gelling agent employed, a fuel composition made therewith will be a relatively fluid gel or a thick stable extrudable gel, which usually can be squeezed from a tube. It is desirable for the gel made to be of sufficient viscosity or thickness so that it may be applied to surfaces of fuel materials, e.g., logs, charcoal without flowing off. Usually the fuel gel should be of a consistency between that of a soft cream, e.g., commercial dental cream, and more solid gels, e.g. gelatins. Preferably the viscosity will be between 20,000 and 200,000 centipoises, and most preefrably in the 50,000 to 100,00 centipoises range. In the case of thixotropic materials, their appearance and firmness, without agitation, should be similar to non-thixotropic materials of the viscosities mentioned above.

Methyl cellulose, when employed as the gelling agent, results in the production of excellent, stable combustible compositions when the methyl cellulose has a viscosity in a preferred range of 50 to 1,500 centipoises, measured on a 2 percent aqueous solution at 20° C. in a Ubbelohde tube. On the other hand, the hydrophilic carboxy vinyl polymers mentioned above form excellent combustible compositions in accordance with the invention when the polymer employed has a viscosity in a range of about 1000 to 3500 centipoises for a 1 percent aqueous solution of the polymer, neutralized with sodium hydroxide and measured on an Interchemical Rotational Viscometer at 20° C. The olefin maleic anhydride copolymer having viscosities in a range of about 10,000 to 200,000 centipoises at 25° C., measured on a 1.0 percent by weight aqueous solution at pH 9, using a Brookfield Viscometer, No. 6 spindle at 25 revolutions per minute, also forms excellent combustible gel compositions in accordance with the invention. It is to be understood, however, that suitable gelling agents having a viscosity value greater or less than the numerical limits set forth above may be used so long as the resulting alcohol fuel gel made therewith exhibits acceptable properties of combustibility, stability, visibility of flame and the like. The most suitable viscosity values for any of the particular gelling agents mentioned in the preparation of the new compositions of the invention are readily determinable by routine tests. For the sake of simplicity, the fuel gels which burn with a substantially non-visible flame and which contain the cellulosic and synthetic gums or other suitable gelling agents will be referred to as fuel gels and the materials for effecting gelation will be referred to as gelling agents throughout the remainder of the specification and in the appended claims.

The fuel gels usually and preferably contain water also. This water is employed in the range of 5 to 25 percent in order to develop a good gel structure. The particular proportion of water used depends on the specific gelling agent used. For example, when nitrocellulose is employed as a gelling agent, about 10–20 percent water is employed in the final composition. The specific amount of water employed in any composition for optimum gel structure is determined by routine tests.

The new fuel gel compositions of the invention can also have optional constituents incorporated therein. Such constituents include dyes, and other adjuvants, such as perfumes, various ash-reducing compositions such as alkali metal salts, e.g., sodium and potassium salts of nitrates, chlorates and the like. One particularly useful ash-reducing composition is sodium nitrate which may be employed as an aqueous solution to the extent of 0.5–1.5 percent preferably 0.5 to 1 percent, solids by weight based on the total composition. The other optional ingredients are normally present in the compositions in amounts of 0.5 percent each or less.

In general, the specific amounts of constituents employed in the preparation of a luminous, visibly burning fuel gel of the invention will depend on the particular properties desired in the end-product. The alcohols are normally used in a range of 60 to 95 percent by weight, based on the total weight of the composition, and preferably in a range of 65 to 85 percent. If desirable, a mixture of methyl and ethyl alcohols can be utilized. The gelling agents are usually used in relatively small amounts in comparison with the alcohol. Satisfactory fuel gels containing from about 2.0 to 6 percent of gelling agents have been prepared. As little as 0.5 percent or less and as much as 10.0 percent or more of the gelling agent may be employed and a satisfactory combustible composition will be attainable.

The illuminating agents described above are generally utilized in relatively minor amounts of about 0.5 to 5.0 percent by weight and preferably in a range of about 1.0 to 3.0 percent. In general, about 3.0 percent or less of the particular illuminating agent in the composition is sufficient to produce a flame having distinct color during combustion. Moreover, the gel structure and storage and use stability of the fuel compositions containing the illuminating agents within the formula given are not detrimentally affected by their presence. On the other hand, in fuel gel compositions containing a related acidic substituted aromatic compound outside the formula, the structure of the gel breaks down.

The invented gels can be easily prepared by non-critical formulation procedures. The alcohol, gelling agent, illuminating agent, water and optional constituents, where they are utilized, can be mixed together in any suitable order of sequence, with agitation, and a stable homogeneous gel results. Generally, agitation of from about 15 to 45 minutes is sufficient. The constituents are normally mixed at a temperature in a range of about 10° C. (room temperature) to a temperature which may be up to the boiling point of the mixture. As a matter of practicality, however, formulating is normally done in a range of about 20 C. to about 65° C. preferably about 25° C. (room temperature). A preferred method of preparing the fuel gel is to mix the required amount of alcohol and dye in a stainless steel container and subsequently to dissolve the illuminating compound and perfume in the above solution while agitating until the mixture is uniform. At this point, the gelling agent is added to the formulation in incremental amounts until addition is complete. Finally, after additional agitation, water, with or without the ash-reducing agent (sodium nitrate) is added to the composition and mixing is continued for an additional 5 minutes or more, if necessary, until a homogeneous stable gel is attained.

In order to illustrate the instant invention more fully, the following representative examples are set forth. In the examples, all parts and percentages are by weight, unless otherwise stated.

*Example I*

A stable fuel gel composition which burns with a visible flame was prepared by adding 68 grams of ethanol, 9 grams of methanol and 0.053 grams of a 1 percent alcoholic solution of Rose Bengal dye to a mixing vessel. The mixture was agitated and 1.0 grams of naphthalene and 0.40 gram of perfume were then added to the mixture while agitation was continued. Subsequently, 6.0 grams of hydroxyethyl cellulose were added to the formulation in incremental amounts over a period of 10 minutes, during which time agitation of the formulation was increased after final addition of the hydroxyethyl cellulose. The mixture was stirred for 10 minutes and then 15.5 grams of a 3.3 percent aqueous solution of sodium nitrate were added to the mixture and agitation was continued for an additional 5 minutes at which time a stable homogeneous gel was formed.

The fuel gel so prepared was extrudable from a collapsible tube and remained on an inclined surface on which it was deposited, and when ignited, burned with a hot, easily visible, bright yellow flame and did not lose its shape or run off during combustion. Only a negligible quantity of ash or residue remained, after combustion was complete.

*Example II*

A stable fuel gel composition which burns with a visible flame was prepared by adding to a mixing vessel 68.9 grams of ethanol, 9 grams of anhydrous methanol and 0.1 gram of a 0.5 percent alcoholic solution of Fuchsine SPB dye, manufactured by the Allied Chemical Corporation, National Aniline Division. Subsequently, 4.0 grams of an ethylene maleic anhydride copolymer having a viscosity of about 160,000 centipoises was added to the mixture with agitation. Finally, 3.0 grams of toluene and 15.0 grams of water were added in that order to the mixing vessel. Agitation was continued for about 5 minutes at which time a stable homogeneous gel was formed.

The gel so prepared remained on an inclined surface on which it was deposited, and when ignited, burned with a hot, easily visible, bright yellow flame and did not lose its shape or run off during combustion.

*Example III*

A stable fuel gel composition which burns with a visible flame was prepared by adding to a mixing vessel 68.9 grams of ethanol, 9 grams of anhydrous methanol, and 0.1 gram of a 0.5 percent alcoholic solution of Rose Bengal dye. The mixture was agitated and 1.0 gram of xylene was added thereto while agitation was continued. Subsequently, 6.0 grams of the hydroxy propyl methyl ether of cellulose were added to the formulation in incremental amounts over a period of 10 minutes, during which time agitation of the formulation was increased after final addition of the hydroxy propyl methyl ether of cellulose. Next 15.0 grams of water were added to the mixing vessel. Agitation of the formulation was continued for an additional 5 minutes at which time a stable homogeneous gel was formed.

The fuel gel so prepared was extrudable from a collapsible tube and remained on an inclined surface on which it was deposited, and when ignited, burned with a hot, easily visible bright yellow flame and did not lose its shape or run off during combustion.

*Example IV*

The procedure of Example III was repeated with like results except that the fuel gel contained the following constituents in the stated amounts mixed together in the listed sequence.

| Constituent: | Amount in grams |
|---|---|
| Nitrocellulose (viscosity 125 through 175 centipoises) | 2.40 |
| Methanol | 51.9 |
| Ethanol | 25.6 |
| Fuchsine SPB (0.5 percent alcoholic solution) | 0.1 |
| Benzaldehyde | 3.0 |
| Water | 17.0 |

*Example V*

Example IV was again repeated except that anthracene was substituted for benzaldehyde. Like results were obtained.

*Example VI*

A stable fuel gel composition which burns with a visible flame was prepared by adding to a mixing vessel 75.74 grams of ethanol, 8.185 grams of methyl alcohol and 0.053 gram of a 0.1 percent alcoholic solution of Fuchsine SPB dye. The mixture was agitated and 0.5 gram of benzoic acid was then added thereto while agitation was continued. Subsequently, 10.355 grams of water were added to the mixture and after 5.167 grams of methyl cellulose having a viscosity between about 50 to 1,500 centipoises were added to the formulation in incremental amounts over a period of 10 minutes, during which time agitation of the formulation was increased after final addition of the methyl cellulose. After about an additional 5 minutes of agitation a stable homogeneous gel was formed.

The gel so prepared was extrudable from a collapsible tube and remained on an inclined surface on which it was deposited, and when ignited, burned with a hot, easily visible, but faintly yellow flame. The gel did not lose its shape or run off during combustion.

*Example VII*

A stable fuel gel composition which burns with a visible flame was prepared by adding to a mixing vessel 61.9 grams of ethanol, 20.0 grams of methyl alcohol and 8.0 grams of water. The mixture was agitated and 2.5 grams of an unneutralized carboxy vinyl copolymer of about 99 percent by weight of glacial acrylic acid and about 1.0 percent by weight of poly allyl sucrose in which the sucrose molecule has an average of about 5 to 6 allyl groups were slowly added to the mixture while agitation was continued. Next 0.1 gram of a 1 percent alcoholic solution of Rose Bengal dye and 5.0 grams of tridecyl benzene were added to the mixture. Subsequently, 2.5 grams of di-2-ethyl hexyl amine were added to the mixture while vigorous agitation was continued for about 5 minutes more to insure a completely neutralized homogeneous composition. The fuel gel so prepared was extrudable from a collapsible tube and remained on an inclined surface on which it was deposited, and when ignited, burned with a hot, easily visible bright yellow flame and did not lose its shape or run off during combustion.

Numerous variations and modifications of the embodiments of this invention may be made without departing from the spirit and scope thereof. Accordingly, the invention is not to be restricted to the specific embodiments set forth herein except as defined in the appended claims.

What is claimed is:

1. A combustible fuel gel composition which burns with a readily visible flame comprising a major proportion of an alcohol fuel gel which by itself burns with a substantially non-visible flame and a minor proportion, sufficient to make said gel burn with a visible flame, of a compound selected from the group consisting of benzaldehyde, benzoic acid, compounds of the formula,

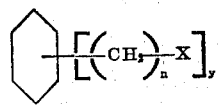

wherein X is selected from the group consisting of hydrogen, —CHO and —COOH, $n$ is a number from 1 to 15, $y$ is a number from 1 to 3 and the total number of carbon atoms in the aliphatic portion of the molecular is 1 to 15, and compounds of the formula,

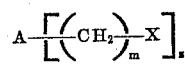

wherein A is selected from the group consisting of naphthalene, anthracene and phenanthrene nuclei, X is selected from the group consisting of hydrogen, —CHO and —COOH, $m$ is a number from 0 to 15, $z$ is a number from 1 to 3 and the total number of carbon atoms in the aliphatic portion of the molecule is 1 to 15.

2. A fuel gel composition as defined in claim 1 wherein the compound is tridecylbenzene.

3. A fuel gel composition as defined in claim 1 wherein the compound is toluene.

4. A fuel gel composition as defined in claim 1 wherein the compound is xylene.

5. A fuel gel composition as defined in claim 1 wherein the compound is anthracene.

6. A fuel gel composition as defined in claim 1 wherein the compound is naphthalene.

7. A combustible fuel gel composition which burns with a readily visible flame comprising a major proportion of an alcohol fuel gel which by itself burns with a substantially non-visible flame and a minor proportion sufficient to make said gel burn with a visible flame and less than about 3.0 percent by weight, based on the total weight of the composition, of a compound selected from the group consisting of benzaldehyde, benzoic acid, compounds of the formula,

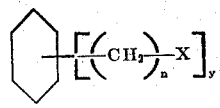

wherein X is selected from the group consisting of hydrogen, —CHO and —COOH, $n$ is a number from 1 to 15, $y$ is a number from 1 to 3 and the total number of carbon atoms in the aliphatic portion of the molecule is 1 to 15, and compounds of the formula,

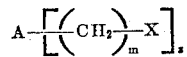

wherein A is selected from the group consisting of naphthalene, anthracene and phenanthrene nuclei, X is selected from the group consisting of hydrogen, —CHO and —COOH, $m$ is a number from 0 to 15, $z$ is a number from 1 to 3 and the total number of carbon atoms in the aliphatic portion of the molecule is 1 to 15.

8. An extrudable stable, combustible fuel gel composition which burns with a soot-free, luminous flame comprising by weight, based on the total weight of the composition, about 95 to 99.5 percent of an alcohol fuel gel which burns by itself with a substantially colorless flame and about 0.5 to 5.0 percent of an illuminating agent selected from the group consisting of benzaldehyde, benzoic acid, compounds of the formula,

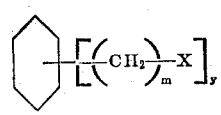

wherein X is selected from the group consisting of hydrogen, —CHO and —COOH, $n$ is a number from 1 to 15, $y$ is a number from 1 to 3 and the total number of carbon atoms in the aliphatic portion of the molecule is 1 to 15, and compounds of the formula,

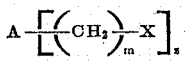

wherein A is selected from the group consisting of naphthalene, anthracene and phenanthrene nuclei, X is selected from the group consisting of hydrogen, —CHO and —COOH, $m$ is a number from 0 to 15, $z$ is a number from 1 to 3 and the total number of carbon atoms in the aliphatic portion of the molecule is 1 to 15.

9. An extrudable, stable, fuel gel composition which burns with a soot-free, luminous flame comprising by weight, based on the total weight of the composition, about 95 to 99.5 percent of an alcohol fuel gel which burns by itself with substantially colorless flame and which comprises an alcohol selected from the group consisting of methyl and ethyl alcohols, water and a gelling agent, and about 1.0 to 3.0 percent of an illuminating agent selected from the group consisting of benzaldehyde, and benzoic acid, and compounds of the formula,

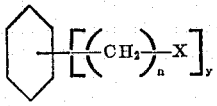

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

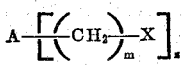

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15.

10. An extrudable, stable, combustible fuel gel composition which burns with a soot-free, luminous flame comprising by weight, based on the total weight of the composition, about 95 to 99.5 percent of an alcohol fuel gel which burns by itself with a substantially colorless flame and which comprises about 60 to 95 percent of an alcohol selected from the group consisting of methyl and ethyl alcohols and mixtures thereof, about 5 to 25 percent of water, about 0.5 to 10 percent of a gelling agent and about 0.5 to 5.0 percent of an illuminating agent selected from the group consisting of benzaldehyde, benzoic acid, compounds of the formula,

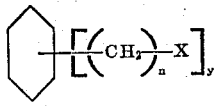

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

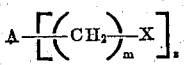

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15.

11. An extrudable, stable, combustible fuel gel composition which burns with a soot-free, luminous flame comprising by weight, based on the total weight of the composition, about 97 to 99 percent of an alcohol fuel gel which burns by itself with a substantially colorless flame and which comprises about 65 to 85 percent of at least one alcohol selected from the group consisting of methyl and ethyl alcohols, about 5 to 25 percent of water, about 2.0 to 6.0 percent of a gelling agent selected from the group consisting of cellulose, methyl cellulose, ethyl cellulose, dihydroxy methyl ether derivatives of cellulose, hydroxyethyl cellulose, hydroxymethyl celluloses, hydroxycellulose, nitrocelluloses, hydrophilic carboxy vinyl polymers, copolymers and interpolymers, olefin maleic anhydride copolymers and soap gels which contain alkali salts of higher fatty acids and higher free fatty acids and about 1.0 to 3.0 percent of an illuminating agent selected from the group consisting of benzaldehyde, benzoic acid, compounds of the formula,

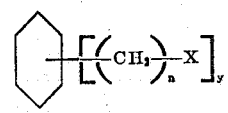

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

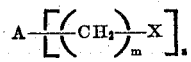

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15.

12. An extrudable, stable combustible fuel gel composition which burns with a soot-free, luminous flame comprising by weight, based on the total weight of the composition, about 95 to 99.5 percent of an alcohol fuel gel which burns by itself with a substantially colorless flame and which comprises about 60 to 95 percent of at least one alcohol selected from the group consisting of methyl and ethyl alcohols, about 5 to 25 percent of water, about 0.5 to 10 percent of a gelling agent selected from the group consisting of cellulose, methyl cellulose, ethyl cellulose, dihydroxy methyl ether derivatives of cellulose, hydroxyethyl cellulose, hydroxymethyl celluloses, hydroxycellulose, nitrocelluloses, hydrophilic carboxy vinyl polymers, copolymers and interpolymers, olefin maleic anhydride copolymers and soap gels which contain alkali salts of higher fatty acids and higher free fatty acids and about 0.5 to 5.0 percent of an illuminating agent selected from the group consisting of benzaldehyde, benzoic acid, compounds of the formula,

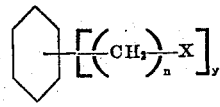

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

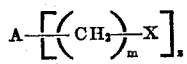

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15.

13. An extrudable, stable, combustible fuel gel composition which burns with a soot-free, luminous flame comprising by weight, based on the total weight of the composition, about 68 percent of ethyl alcohol, 9 percent of methanol, 6 percent of hydroxyethyl cellulose, 15 percent of a 3.3 percent aqueous sodium nitrate solution, 1 percent naphthalene and 1 percent of perfume and a dye.

14. A process for preparing a combustible fuel gel composition which burns with a readily visible flame comprising mixing, at a temperature in a range of about 20° C. to the boiling point of the mixture, a major proportion of a fuel gel which by itself burns with a substantially non-visible flame, and a minor portion sufficient to make the gel burn with a visible flame of a compound selected from the group consisting of benzaldehyde, benzoic acid, compounds of the formula,

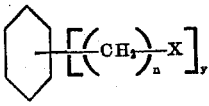

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

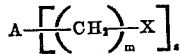

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15, and agitating the mixture until a homogeneous stable gel is attained.

15. A process for preparing an extrudable, stable, combustible fuel gel composition which burns with a soot-free, luminous flame comprising mixing with agitation at a temperature in a range of about 20° C. to 65° C. about 60 to 95 percent of ethyl alcohol, about 0.5 to 5.0 percent of an illuminating agent selected from the group consisting of benzaldehyde, benzoic acid, and compounds of the formula,

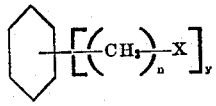

wherein X is selected from the group consisting of a hydrogen —CHO and —COOH, $n$ is a number from 1 to 15, $y$ is a number from 1 to 3 and the total number of carbon atoms in the aliphatic portion of the molecule is 1 to 15, and compounds of the formula,

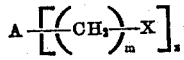

wherein A is selected from the group consisting of naphthalene, anthracene and phenanthrene nuclei, X is selected from the group consisting of a hydrogen —CHO and —COOH, $m$ is a number from 0 to 15, $z$ is a number from 1 to 3 and the total number of carbon atoms in the aliphatic portion of the molecule is 1 to 15, adding about 0.5 to 10 percent of a gelling agent to the mixture and subsequently adding about 0.1 to 1.5 percent of an alkali metal salt selected from the group consisting of alkali metal nitrates and chlorates in an aqueous solution which also provides about 5 to 25 percent water, and continuously agitating the mixture until a stable homogeneous gel is attained.

References Cited by the Examiner
UNITED STATES PATENTS

| | | | |
|---|---|---|---|
| 2,161,385 | 6/39 | Ringer | 44—7 |
| 2,443,378 | 6/48 | Dittmar | 44—7 |
| 3,072,467 | 1/63 | Wiczer | 44—7.3 |

DANIEL E. WYMAN, *Primary Examiner.*